United States Patent
Ohashi

(10) Patent No.: US 12,096,212 B2
(45) Date of Patent: Sep. 17, 2024

(54) UNAUTHORIZED COMMUNICATION PREVENTION SYSTEM AND UNAUTHORIZED COMMUNICATION PREVENTION METHOD

(71) Applicant: KABUSHIKI KAISHA TOKAI RIKA DENKI SEISAKUSHO, Aichi (JP)

(72) Inventor: Yosuke Ohashi, Aichi (JP)

(73) Assignee: KABUSHIKI KAISHA TOKAI RIKA DENKI SEISAKUSHO, Aichi (JP)

(*) Notice: Subject to any disclaimer, the term of this patent is extended or adjusted under 35 U.S.C. 154(b) by 380 days.

(21) Appl. No.: 17/601,846

(22) PCT Filed: Mar. 31, 2020

(86) PCT No.: PCT/JP2020/014816
§ 371 (c)(1),
(2) Date: Oct. 6, 2021

(87) PCT Pub. No.: WO2020/209141
PCT Pub. Date: Oct. 15, 2020

(65) Prior Publication Data
US 2022/0210641 A1    Jun. 30, 2022

(30) Foreign Application Priority Data
Apr. 12, 2019 (JP) ................... 2019-076304

(51) Int. Cl.
*H04W 12/06* (2021.01)
*B60R 25/24* (2013.01)
(Continued)

(52) U.S. Cl.
CPC ............ *H04W 12/06* (2013.01); *B60R 25/24* (2013.01); *H04B 1/7163* (2013.01); *B60R 25/04* (2013.01);
(Continued)

(58) Field of Classification Search
CPC .............................. H04W 12/06; H04W 12/63
See application file for complete search history.

(56) References Cited

U.S. PATENT DOCUMENTS 7,289,790 B2* 10/2007 McCorkle ........... H04L 27/0004
455/410
2003/0220765 A1* 11/2003 Overy ................... H04W 12/08
702/158
(Continued)

FOREIGN PATENT DOCUMENTS

CN      101089897      12/2007
JP      2006-7871      1/2006
(Continued)

OTHER PUBLICATIONS

International Search Report issued in International Patent Application No. PCT/JP2020/014816, dated Jul. 21, 2020, along with an English translation thereof.

*Primary Examiner* — Ponnoreay Pich
(74) *Attorney, Agent, or Firm* — Greenblum & Bernstein, P.L.C.

(57) ABSTRACT

An unauthorized communication prevention system includes a communication device that is arranged in an operation subject and configured to wirelessly communicate with a terminal. The system further includes a notification unit that transmits unique authentication information of the operation subject when the terminal and the communication device establish communication; a checking unit that checks, with the authentication information, whether the terminal and the operation subject are a proper pair; and an actuation unit that performs a process for determining a positional relationship of the terminal relative to the operation subject in accordance with a check result of the checking unit.

2 Claims, 3 Drawing Sheets

(51) Int. Cl.
*H04B 1/7163* (2011.01)
*B60R 25/04* (2013.01)

(52) U.S. Cl.
CPC .................... *B60R 2325/10* (2013.01); *H04B 2201/71634* (2013.01)

(56) References Cited

U.S. PATENT DOCUMENTS

| | | |
|---|---|---|
| 2007/0288995 A1 | 12/2007 | Terada et al. |
| 2015/0099486 A1* | 4/2015 | Choi ................ H04M 1/72412 455/411 |
| 2019/0116619 A1* | 4/2019 | Hauck ................ H04W 12/041 |
| 2019/0135229 A1* | 5/2019 | Ledvina ................ H04W 76/10 |
| 2019/0256047 A1* | 8/2019 | Iwashita ............ G01S 13/0209 |
| 2019/0263358 A1 | 8/2019 | Kusumoto et al. |
| 2020/0062217 A1 | 2/2020 | Ledvina et al. |
| 2022/0225267 A1 | 7/2022 | Hauck et al. |

FOREIGN PATENT DOCUMENTS

| | | |
|---|---|---|
| JP | 2010-219794 | 9/2010 |
| JP | 2018-62766 | 4/2018 |
| JP | 2018-71190 | 5/2018 |
| JP | 2018-71213 | 5/2018 |
| JP | 2018-91071 | 6/2018 |
| WO | 2017/181132 | 10/2017 |
| WO | 2019/067105 | 4/2019 |

\* cited by examiner

UNAUTHORIZED COMMUNICATION PREVENTION SYSTEM AND UNAUTHORIZED COMMUNICATION PREVENTION METHOD

TECHNICAL FIELD

The present invention relates to an unauthorized communication prevention system and an unauthorized communication prevention method for preventing the establishment of unauthorized communication.

BACKGROUND ART

A known technique transmits and receives radio waves in the ultra-wideband (UWB) between devices that perform wireless communication and measures the distance between the devices from a propagation time required for the transmission and reception of the radio waves to determine the validity of the distance between the two devices (refer to, for example, Patent Document 1). With this technique, for example, in a situation where a relay or the like is used to establish unauthorized communication, unauthorized communication is recognized when the measured distance is greater than or equal to a threshold value. This allows the establishment of unauthorized communication to be prevented in advance.

Patent Document 1: Japanese Laid-Open Patent Publication No. 2018-91071

SUMMARY

When UWB communication is performed between devices, there may be another device that is not subject to distance determination. In this case, when a terminal transmits UWB radio waves to a device paired with the terminal, the paired device and the other device may both return UWB radio waves. In this case, the radio waves from the other device may interfere with communication.

It is an objective of the present invention to provide an unauthorized communication prevention system and an unauthorized communication prevention method that allow communication to be performed between a terminal and a communication device to check the positional relationship without being interfered by another communication device.

In one aspect, an unauthorized communication prevention system determines a positional relationship of a terminal relative to an operation subject through communication established between a communication device, which is arranged in the operation subject, and the terminal, in which the operation subject is actuated or allowed to be actuated when authentication is accomplished through wireless communication with the terminal, and the communication device is able to perform communication that differs from communication for the authentication. The unauthorized communication prevention system includes: a notification unit that transmits unique authentication information of the operation subject when the terminal and the communication device establish communication; a checking unit that checks, with the authentication information, whether the terminal and the operation subject are a proper pair; and an actuation unit that performs a process for determining the positional relationship in accordance with a check result of the checking unit.

In another aspect, an unauthorized communication prevention method determines whether a positional relationship of a terminal relative to an operation subject is valid through communication established between a communication device, which is arranged in the operation subject, and the terminal, in which the operation subject is actuated or allowed to be actuated when authentication is accomplished through wireless communication with the terminal, and the communication device is able to perform communication that differs from communication for the authentication. The unauthorized communication prevention method includes: transmitting unique authentication information of the operation subject when the terminal and the communication device establish communication; checking, with the authentication information, whether the terminal and the operation subject are a proper pair; and performing a process for determining the positional relationship in accordance with a checking result of the authentication information.

DESCRIPTION OF THE EMBODIMENTS

An unauthorized communication prevention system and an unauthorized communication prevention method according to one embodiment will now be described with reference to FIGS. 1 to 4.

Figure 1:
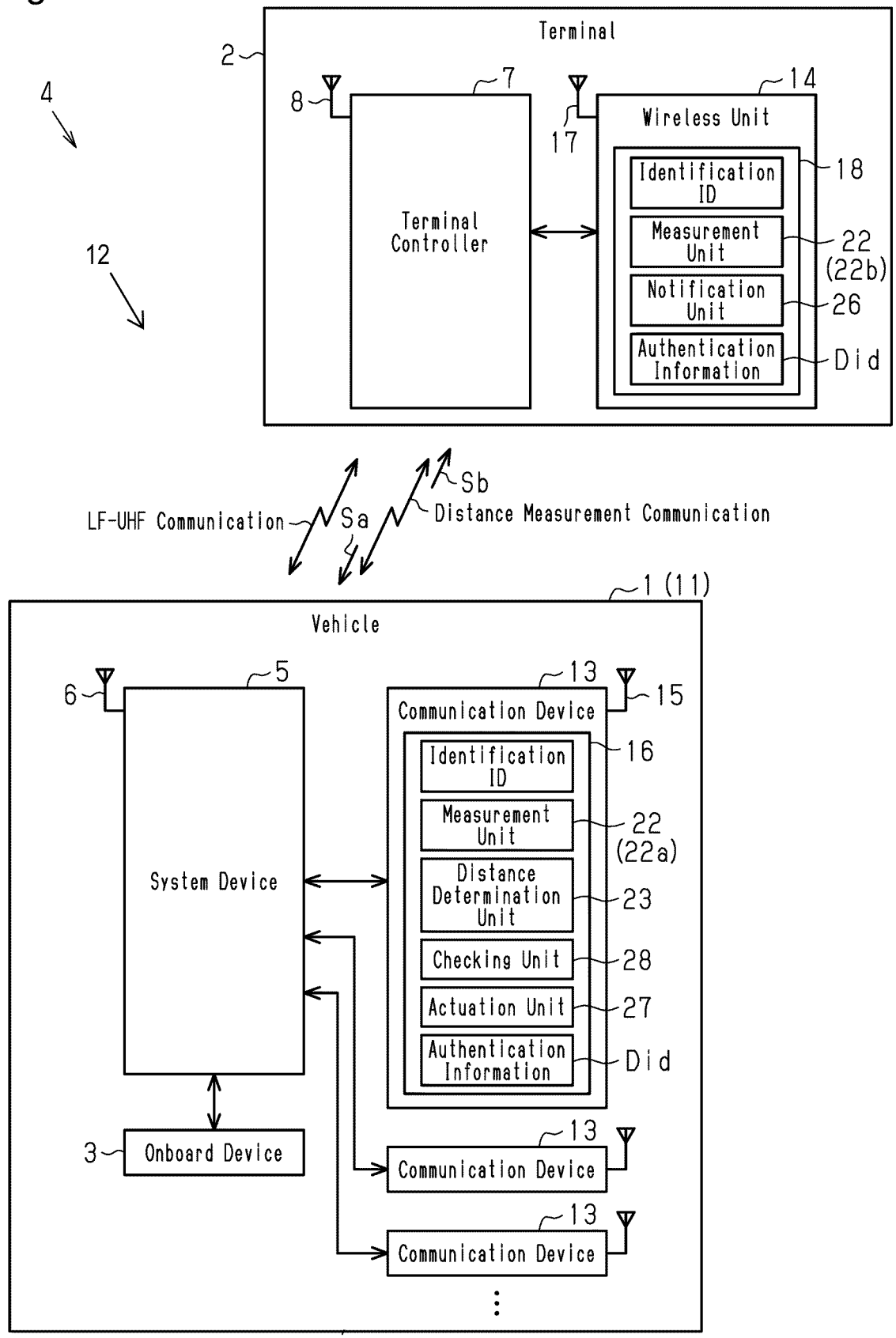
FIG. 1 is a diagram of an unauthorized communication prevention system according to one embodiment.

As shown in FIG. 1, a vehicle 1 includes an electronic key system 4 that authenticates a terminal 2 through wireless communication to actuate or permit actuation of an onboard device 3. Preferably, the electronic key system 4 of the present example is a smart verification system that performs ID verification (smart verification) through near-range wireless communication in accordance with communication from the vehicle 1. Examples of the onboard device 3 include a door locking device that opens and closes a vehicle door, the engine of the vehicle 1, and the like. The terminal 2 may be an electronic key, which mainly has a key functionality, or a high-performance mobile phone to which a key functionality is registered.

The electronic key system 4 includes a system device 5 arranged in the vehicle 1 to actuate the electronic key system 4. An electronic key ID and a unique key code used for smart verification are registered to the system device 5. The system device 5 includes a vehicle communication unit 6 that transmits and receives various types of radio waves when the system device 5 performs communication for ID verification with the terminal 2. Radio waves are transmitted from the system device 5 to the terminal 2 in the low frequency (LF) band and from the terminal 2 to the system device 5 in the ultra-high frequency (UHF) band.

The terminal 2 includes a terminal controller 7 that controls the operation of the terminal 2 and a terminal communication unit 8 that transmits and receives radio waves. A unique key ID and a unique key code of the terminal 2 are registered to the terminal controller 7. The terminal communication unit 8 includes a receiver that receives radio waves at the terminal 2 and a transmitter that transmits radio waves from the terminal 2.

When the vehicle 1 is in a parked state, the terminal 2 receives radio waves (wake signal) transmitted in the LF band from an exterior transmitter (not shown) of the vehicle communication unit 6, and the terminal 2 transmits a response in the UHF band to the vehicle 1 to start exterior smart verification. The exterior smart verification includes key ID verification, challenge-response authentication using a unique key code, and the like. The exterior smart verification needs to be accomplished to perform or permit door locking and unlocking. Further, the terminal 2 receives radio waves (wake signal) transmitted in the LF band by an interior transmitter (not shown) of the vehicle communication unit 6, and the terminal 2 transmits a response in the UHF band to the vehicle 1 to start interior smart verification. The interior smart verification and the exterior smart verification are processed in the same manner. The interior smart verification needs to be accomplished to permit a power supply shifting operation (such as engine start operation) of the vehicle.

The vehicle 1 has the functionality (unauthorized communication prevention system 12) for improving security against unauthorized use of the vehicle 1 based on the distance between the terminal 2 and the vehicle 1 measured through communication differing from the communication used to authenticate the terminal 2. The vehicle 1 is an example of an operation subject 11 operated by the terminal 2. In the present example, the terminal 2, when authenticated, is used as a vehicle key to actuate the vehicle 1. The vehicle 1 includes the unauthorized communication prevention system 12 to prevent unauthorized communication that connects the terminal 2 at a remote location to the vehicle 1 with a relay or the like. This prevents smart verification, which is not intended by the user, from being accomplished.

The unauthorized communication prevention system 12 includes communication devices 13 of the vehicle 1 and a wireless unit 14 of the terminal 2 to determine the positional relationship of the vehicle 1 and the terminal 2 through communication between the vehicle 1 and the terminal 2. In the present example, the positional relationship is determined by measuring the distance between the vehicle 1 and the terminal 2. Each communication device 13 and the wireless unit 14 transmit and receive radio waves in the ultra-wideband (UWB) to measure the distance between the communication device 13 and the wireless unit 14. The UWB radio waves used for distance measurement allows the distance between the communication device 13 and the wireless unit 14 to be measured with high resolution (e.g., tens of centimeters).

Each communication device 13 includes an antenna 15 that transmits and receives UWB radio waves and a communication controller 16 that controls the operation of the antenna 15. The communication controller 16 of each communication device 13 stores an identification ID (communication device ID) as unique ID information about the communication device 13 in a memory or the like. The communication device 13 is wire-connected to the system device 5. The wireless unit 14 includes an antenna 17 and a communication controller 18 in the same manner as the communication device 13. The communication controller 18 of the wireless unit 14 stores the identification ID of each communication device 13 that the communication controller 18 communicates with. The wireless unit 14 is wire-connected to the terminal controller 7.

Figure 2:
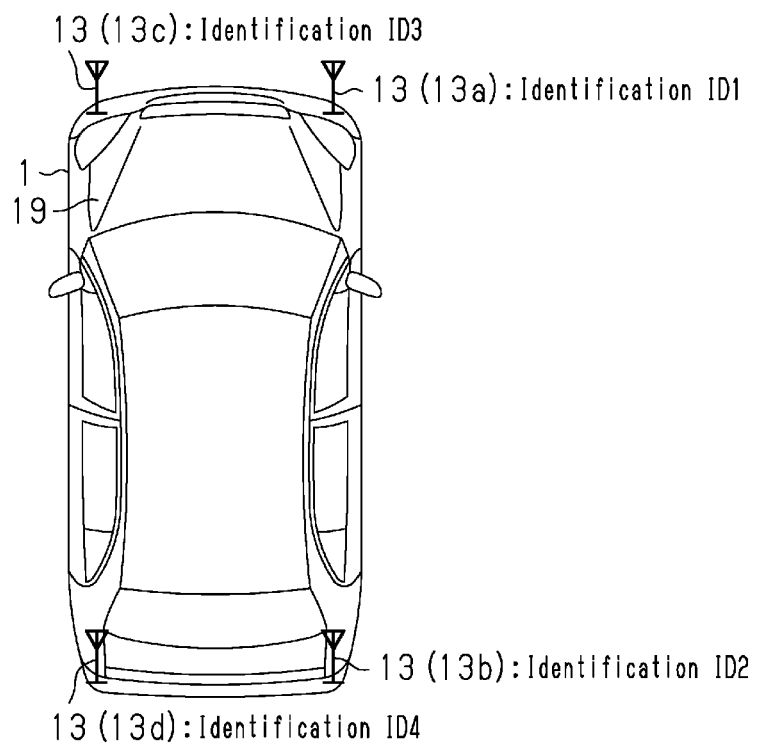
FIG. 2 is a schematic diagram showing the locations of onboard communication devices.

As shown in FIG. 2, multiple (four in the present example) communication devices 13 are arranged on a vehicle body 19. The communication devices 13 of the present example are located at the four corners of the vehicle body 19. In the present example, the communication devices 13 include a first communication device 13a located at the front right corner of the vehicle body, a second communication device 13b located at the rear right corner of the vehicle body, a third communication device 13c located at the front left corner of the vehicle body, and a fourth communication device 13d located at the rear left corner of the vehicle body.

In the present example, the identification ID of the first communication device 13a is referred to as an identification ID1, the identification ID of the second communication device 13b is referred to as an identification ID2, the identification ID of the third communication device 13c is referred to as an identification ID3, and the identification ID of the fourth communication device 13d is referred to as an identification ID4. Further, the wireless unit 14 stores the identification ID1 to identification ID4 of the first communication device 13a to the fourth communication device 13d in a memory or the like to perform distance measurement communication with the first communication device 13a to the fourth communication device 13d.

With reference to FIG. 1, the unauthorized communication prevention system 12 includes a measurement unit 22 that measures a parameter used to check the positional relationship of the communication device 13 and the wireless unit 14. The measurement unit 22 of the present example includes a measurement unit 22a arranged in each communication device 13 and a measurement unit 22b arranged in the wireless unit 14. The measurement unit 22a is arranged in the communication controller 16 of each communication device 13. The measurement unit 22b is arranged in the communication controller 18 of the wireless unit 14. The measurement unit 22 of the present example performs distance measurement communication to transmit and receive UWB radio waves between the communication device 13 and the wireless unit 14. Then, the measurement unit 22 obtains the propagation time required for the communication and measures a measurement value Dx based on the distance between the two devices as a parameter to check the positional relationship of the communication device 13 and the wireless unit 14 from the propagation time. The measurement unit 22 performs communication, which transmits and receives UWB radio waves, through communication (cryptographic communication) that uses a predetermined encryption code. Preferably, the measurement value Dx indicates the distance between the communication device 13 and the wireless unit 14.

The unauthorized communication prevention system 12 includes a distance determination unit 23 that determines the validity of the positional relationship of the communication device 13 and the wireless unit 14 based on the measurement value Dx obtained by the measurement unit 22. The distance determination unit 23 is arranged in each communication device 13 (communication controller 16). The distance determination unit 23 performs distance measurement determination for checking the validity of the positional relationship of the communication device 13 and the wireless unit 14 by comparing the measurement value Dx obtained by the measurement unit 22 with a preset threshold value Dk. When the measurement value Dx is less than the threshold value Dk, the distance determination unit 23 determines that the positional relationship of the communication device 13 and the wireless unit 14 is valid. When the measurement value Dx is greater than or equal to the threshold value Dk, the distance determination unit 23 determines that the positional relationship of the communication device 13 and the wireless unit 14 is invalid.

Another vehicle may be located near the vehicle and the other vehicle may include a communication device 13. In this case, when the terminal 2 performs distance measurement communication with the communication device 13 of the corresponding vehicle, UWB radio waves transmitted from the terminal 2 may reach the communication device 13 of the other vehicle. Then, distance measurement determination may be performed using UWB radio waves transmitted from the communication device 13 of the other vehicle instead of the communication device 13 of the corresponding vehicle. This may adversely affect the distance measurement determination. The present example resolves this problem.

In the present example, authentication information Did that is used in the distance measurement communication to determine whether the communication device 13 is included in the corresponding vehicle (vehicle 1) or another vehicle is registered to the communication device 13 and the wireless unit 14. Preferably, the authentication information Did is an individual ID (individual vehicle ID) registered to, for example, the vehicle 1. Preferably, the authentication information Did is registered to both the communication device 13 and the wireless unit 14 through, for example, the electronic key system 4 of the vehicle 1.

The unauthorized communication prevention system 12 includes a notification unit 26 that transmits the unique authentication information Did, which is registered to the vehicle 1, when the terminal 2 and the communication device 13 establish communication. The notification unit 26 is arranged in the wireless unit 14 (communication controller 18). The notification unit 26 notifies a peer device (communication device 13) of the authentication information Did during distance measurement communication performed between the vehicle 1 and the terminal 2.

The unauthorized communication prevention system 12 includes a checking unit 28 that uses the authentication information Did to check whether the terminal 2 and the vehicle 1 is a proper pair. The checking unit 28 is arranged in each communication device 13 (communication controller 16). The checking unit 28 uses the authentication information Did to check whether the communication device 13 is included in the corresponding vehicle (vehicle 1) or another vehicle. The checking unit 28 verifies the authenticity of the authentication information Did by comparing the authentication information Did obtained from the terminal 2 with the authentication information Did registered to the communication device 13.

The unauthorized communication prevention system 12 includes an actuation unit 27 that performs a process for distance measurement determination in accordance with the verification result of the authentication information Did. Specifically, when the checking unit 28 verifies that the terminal 2 and the vehicle 1 is a proper pair, the actuation unit 27 serves as a location determination actuation unit that performs a process for determining the positional relationship of the terminal 2 and the vehicle 1. The actuation unit 27 is arranged in each communication device 13 (communication controller 16). When determining that the authentication information Did match, the actuation unit 27 continues the communication between the terminal 2 and the communication device 13, specifically, the distance measurement communication. When the authentication information Did do not match, the actuation unit 27 ends the communication between the terminal 2 and the communication device 13, specifically, the distance measurement communication.

Figure 3:
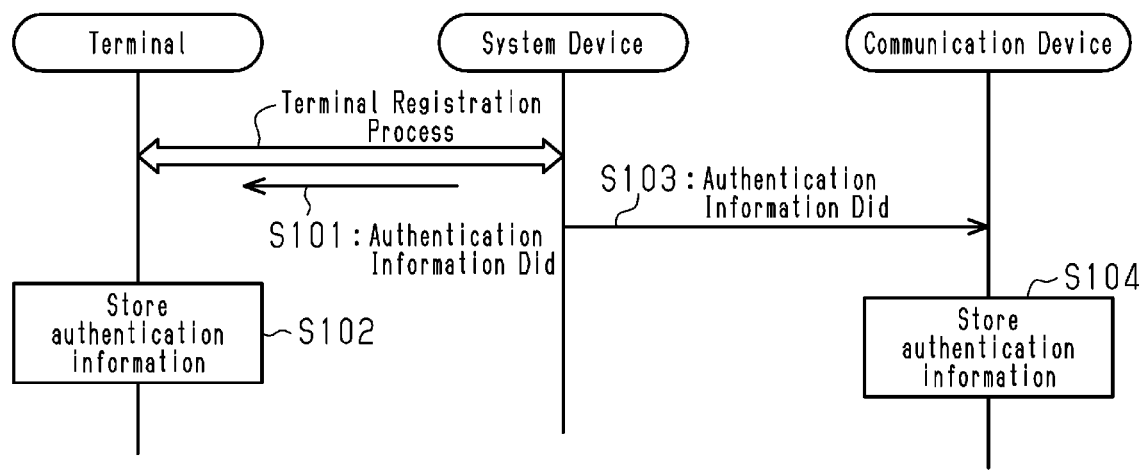
FIG. 3 is a flowchart showing the procedure for registering authentication information.
Figure 4:
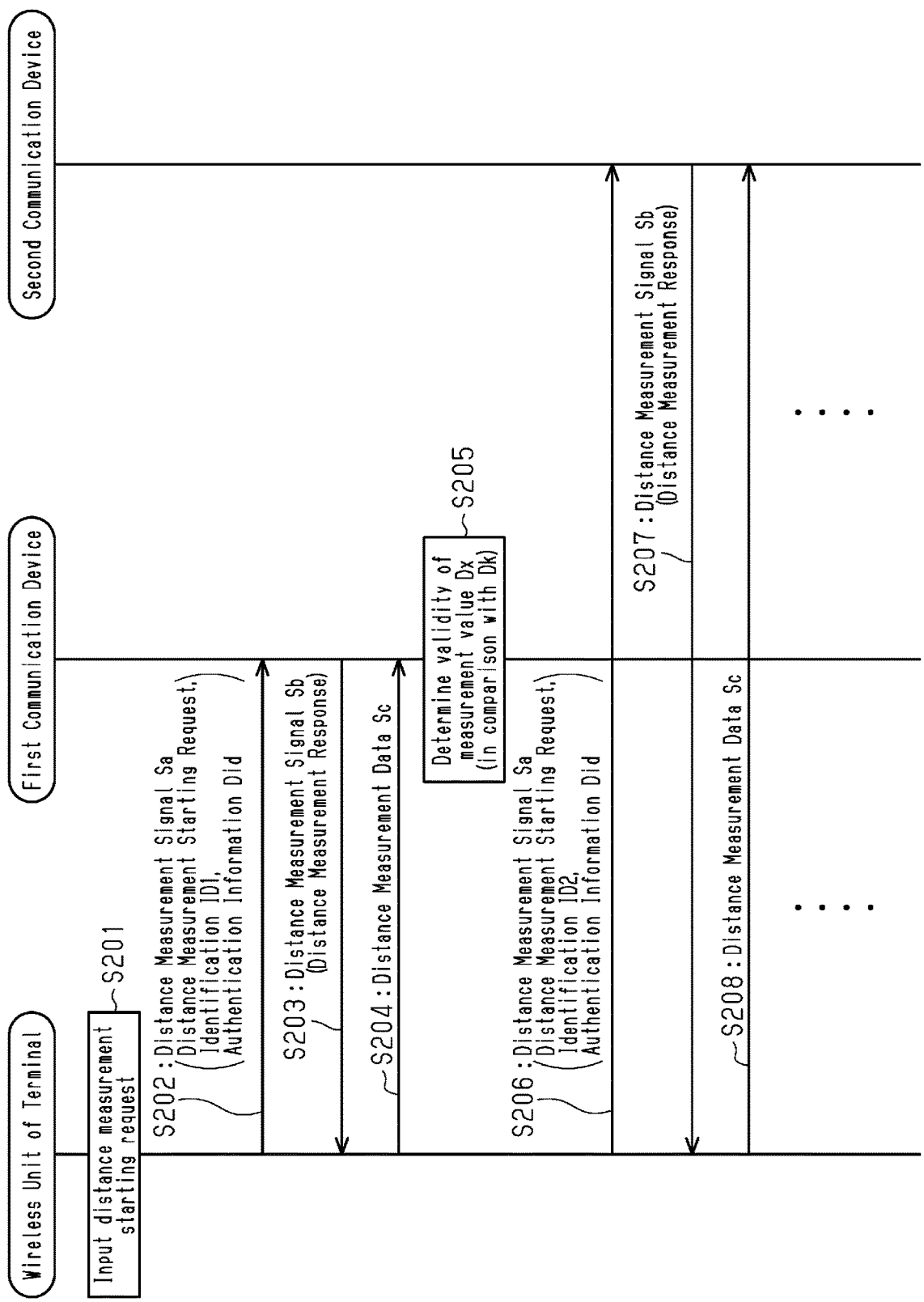
FIG. 4 is a flowchart showing the procedure for performing distance measurement determination.

With reference to FIGS. 3 and 4, the operation and advantages of the unauthorized communication prevention system in the present embodiment will now be described.

FIG. 3 illustrates a procedure for registering authentication information Did to the terminal 2 and the communication devices 13. First, in step 101, when performing a process for registering the terminal 2 to the system device 5 (terminal registration process), the system device 5 reads the authentication information Did from the vehicle body 19 that is registered to the vehicle 1 and transmits the authentication information Did to the terminal 2. In the terminal registration process, an electronic key ID and a unique key code stored in the terminal 2 are registered to the system device 5 of the vehicle 1 through, for example, the communication network of the electronic key system 4. The authentication information Did is LF-transmitted by, for example, the vehicle communication unit 6 to the terminal 2 so that the terminal 2 obtains the authentication information Did when the terminal registration process is performed.

In step 102, the terminal 2 receives the authentication information Did from the system device 5 and stores the authentication information Did in the memory (not shown) of the wireless unit 14. This registers the authentication information Did to the terminal 2.

In step 103, when transmitting the authentication information Did to the terminal 2, the system device 5 notifies the communication devices 13 of the authentication information Did. In this case, if the communication devices 13 are connected to the system device 5 by an interior communication line, the authentication information Did is output from the system device 5 to the communication devices 13 via the communication line. The communication line includes, for example, a Local Interconnect Network (LIN) and a Controller Area Network. The system device 5 outputs the authentication information Did to the communication devices 13 arranged in the vehicle 1.

In step 104, the communication devices 13 obtain the authentication information Did from the system device 5 and store the authentication information Did in the corresponding memories (not shown). This registers the authentication information Did to the communication devices 13.

FIG. 4 illustrates a procedure for performing distance measurement determination (distance measurement communication). In step 201, when a distance measurement starting request is input to instruct starting of distance measurement, the measurement unit 22b of the wireless unit 14 starts distance measurement communication to measure the distance between the vehicle 1 and the terminal 2. Preferably, the distance measurement starting request is input from the vehicle 1 (system device 5) through smart communication performed by, for example, the vehicle 1 and the terminal 2. Thus, preferably, the distance measurement communication is performed together with the smart communication.

In step 202, the measurement unit 22b of the wireless unit 14 in the distance measurement communication transmits a distance measurement signal Sa in the UWB band from the antenna 17 of the wireless unit 14 toward the communication device 13. In the present example, the measurement unit 22b successively performs distance measurement communication with the communication devices 13 located on the vehicle body 19. Specifically, the distance measurement communication is performed in the order of, for example, the first communication device 13a, the second communication device 13b, the third communication device 13c, and the fourth communication device 13d.

The measurement unit 22b of the wireless unit 14 transmits the distance measurement signal Sa to a communication peer that is the first communication device 13a. In this case, when the distance measurement signal Sa is transmitted to the first communication device 13a, the notification unit 26 notifies the first communication device 13a of the authentication information Did that is registered to the terminal 2. Thus, when the first communication device 13a is the communication peer, the distance measurement signal Sa includes a distance measurement starting request, which instructs distance measurement communication to be started, the identification ID1 of the first communication device 13a, which is the present communication peer, and the authentication information Did, which is registered to the terminal 2. The distance measurement signal Sa is transmitted after being encrypted with an encryption key that is registered in advance to, for example, the first communication device 13a and the wireless unit 14.

When receiving the distance measurement signal Sa from the wireless unit 14, the measurement unit 22a of the first communication device 13a checks the identification ID1 included in the distance measurement signal Sa to obtain the distance measurement signal Sa transmitted from the wireless unit 14. That is, the first communication device 13a, of which the identification ID1 matches the identification ID1 included in the distance measurement signal Sa, receives the distance measurement signal Sa transmitted from the wireless unit 14.

Further, when receiving the distance measurement signal Sa from the wireless unit 14, the checking unit 28 of the first communication device 13a verifies the authenticity of the authentication information Did by comparing the authentication information Did in the distance measurement signal Sa with the authentication information Did that is registered to the first communication device 13a. In the verification of the authenticity of the authentication information Did, the authentication information Did transmitted from the wireless unit 14 of the terminal 2 that is paired with the vehicle 1 will match the authentication information Did that is registered to the first communication device 13a. Thus, when the authentication information Did match, the actuation unit 27 allows the distance measurement communication to be continued.

In contrast, when the distance measurement signal Sa reaches another vehicle 1 that is not paired with the terminal 2, the authenticity of the authentication information Did will not be verified by the communication devices 13 of the other vehicle 1. In other words, when the vehicle 1 is not paired with the terminal 2, the authentication information Did of the terminal 2 will differ from and not match the authentication information Did of each communication device 13 in the other vehicle. Thus, even if the communication device 13 of the other vehicle receives the distance measurement signal Sa, the distance measurement communication cannot be further continued. The distance measurement communication will not be continued, for example, when the authentication information Did cannot be verified or the authentication information Did cannot be decoded because of a difference in data format or the like.

In step 203, when the authentication information Did included in the distance measurement signal Sa matches, the measurement unit 22a of the first communication device 13a transmits a distance measurement signal Sb in the same UWB band from the antenna 15 in response through distance measurement communication. The distance measurement signal Sb includes at least a distance measurement response that is a response in the distance measurement communication. The distance measurement signal Sb is transmitted after being encrypted with the encryption key that is registered in advance to, for example, the first communication device 13a and the wireless unit 14.

In step 204, upon receipt of the distance measurement signal Sb from the first communication device 13a, the measurement unit 22b of the wireless unit 14 transmits distance measurement data Sc, which is related to the propagation time required for transmitting and receiving the distance measurement signals Sa and Sb, to the first communication device 13a through UWB communication. The propagation time is obtained by, for example, checking timestamps that are attached to the transmitted signals.

In step 205, upon receipt of the distance measurement data Sc from the wireless unit 14, the distance determination unit 23 of the first communication device 13a determines the validity of a measurement value Dx (distance between terminal 2 and first communication device 13a) calculated from the distance measurement data Sc. The distance determination unit 23 verifies the authenticity of the distance measurement determination by comparing the calculated measurement value Dx with a threshold value Dk. When the measurement value Dx is less than the threshold value Dk, the distance determination unit 23 determines that the distance measurement determination is valid. When the measurement value Dx is greater than or equal to the threshold value Dk, the distance determination unit 23 determines that the distance measurement determination is invalid. When the distance measurement determination is invalid, the terminal 2 is not permitted to actuate (prohibited from actuating) the vehicle 1 regardless of whether the smart verification has been accomplished.

Then, in step 206, the measurement unit 22b of the wireless unit 14 transmits a distance measurement signal Sa to a communication peer that is the second communication device 13b. When the second communication device 13b is the communication peer, the distance measurement signal Sa includes a distance measurement starting request, which instructs distance measurement communication to be started, the identification ID2 of the second communication device 13b, which is the present communication peer, and the authentication information Did, which is registered to the terminal 2. The distance measurement signal Sa is transmitted after being encrypted with an encryption key that is registered in advance to, for example, the second communication device 13b and the wireless unit 14. The distance measurement signal Sa is received by the second communication device 13b having the matching identification ID2.

In step 207, when the authentication information Did included in the distance measurement signal Sa matches, the measurement unit 22a of the second communication device 13b transmits a distance measurement signal Sb in the same UWB band from the antenna 15 in response through distance measurement communication. The distance measurement signal Sb is transmitted after being encrypted with the encryption key that is registered in advance to, for example, the second communication device 13b and the wireless unit 14.

In step 208, upon receipt of the distance measurement signal Sb from the second communication device 13b, the measurement unit 22b of the wireless unit 14 transmits distance measurement data Sc, which is related to the propagation time required for transmitting and receiving the distance measurement signals Sa and Sb, to the second communication device 13b through UWB communication. The distance determination unit 23 of the second communication device 13b determines the validity of the distance measurement data Sc. When the distance measurement determination is valid, the process continues. When the distance measurement determination is invalid, the terminal 2 is not permitted to actuate (prohibited from actuating) the vehicle 1.

The above distance measurement determination is performed in the same manner with the wireless unit 14 (terminal 2) and the other communication devices 13 (third communication device 13c, fourth communication device 13d) of the vehicle 1. In the present example, after distance measurement communication is performed with the first communication device 13a, distance measurement communication is performed in the order of the second communication device 13b, the third communication device 13c, and the fourth communication device 13d. There may be a communication device 13 that cannot establish distance measurement communication due to the effect of the vehicle body 19, a human body, or the like depending on where the terminal 2 is located. Thus, if communication has not been established for a fixed time since the start of the distance measurement communication, communication may be terminated and the process may shift to other communication devices 13.

Further, the distance measurement communication does not need to be performed after smart communication (smart verification) is performed by the terminal 2 and the system device 5. In other words, the distance measurement communication may be performed during smart communication or before smart communication starts instead of after smart communication (after smart verification is accomplished).

In the present example, when the terminal 2 (wireless unit 14) and the communication device 13 perform communication to check the positional relationship (distance measurement communication), even if another vehicle (communication device 13) that does not correspond to the terminal 2 is located nearby, the communication for checking the positional relationship is established only between the terminal 2 and the communication device 13 arranged in the corresponding vehicle with the authentication information Did of the vehicle 1 notified during the communication. Thus, unnecessary interference caused by the communication device 13 of the other vehicle is less likely to occur when communication is established between the terminal 2 and the communication device 13 to check the positional relationship (distance measurement communication).

The notification unit 26 notifies its communication peer (communication device 13) of the authentication information Did during the distance measurement communication performed between the vehicle 1 and the terminal 2. Thus, in the present example, the authentication information Did is transmitted to the communication device 13 in the process of the distance measurement communication. This is advantageous for reducing time used to process communication.

The authentication information Did includes an individual ID assigned to the vehicle 1. Thus, a simple process for checking the individual ID of the vehicle 1 determines whether the communication device 13 is a corresponding device.

The communication device 13 obtains the authentication information Did from the system device 5 that performs authentication in the vehicle 1, which serves as the operation subject 11. Thus, the communication device 13 easily obtains the authentication information Did from the onboard system device 5.

The communication devices 13 are arranged in the vehicle 1. Distance measurement communication is performed by the communication devices 13 and the terminal 2. Thus, the terminal 2 communicates with the communication devices 13 and determines the validity of the positional relationship. This is advantageous for accurately detecting the position of the terminal 2 relative to the vehicle 1.

The present embodiment may be modified as follows. The present embodiment and the following modifications can be combined as long as the combined modifications remain technically consistent with each other.

The authentication information Did of the terminal 2 may be stored in, for example, the memory of the terminal controller 7.

The authentication information Did does not need to be notified to its communication peer during distance measurement communication and may be notified to its communication peer at a time differing from the distance measurement communication.

The authentication information Did does not need to be registered through the communication network of the electronic key system 4 and may be registered by, for example, a tool (registration tool). In this case, the tool is connected to, for example, the vehicle 1 to obtain the authentication information Did from the vehicle 1. Then, the tool is connected to the terminal 2 to assign the authentication information Did from the tool to the terminal 2 so that the authentication information Did is registered to the terminal 2.

When the terminal 2 transmits a distance measurement signal Sa to the communication device 13 of another vehicle, the terminal 2, which has transmitted the distance measurement signal Sa, cannot receive a distance measurement signal Sb including a distance measurement response. Thus, when the terminal 2 transmits the distance measurement signal Sa and then cannot receive a distance measurement signal Sb for a fixed time, the distance measurement communication may be terminated (stopped).

The authentication information Did of the vehicle 1 may be registered to various types of ECU such as a verification ECU in, for example, the vehicle body 19.

During distance measurement communication, the communication device 13 may transmit UWB radio waves to the terminal 2, and the terminal 2, which receives the UWB radio waves, may transmit the same UWB radio waves to the communication device 13.

The distance determination (between terminal 2 and communication device 13) may be collectively performed by, for example, a single ECU or the like. In this case, the communication devices 13 only measure a distance and output a measurement value Dx to the ECU.

The distance measurement communication may be performed in a sequence in which UWB radio waves are sent back and forth only once between the terminal 2 and the communication device 13. In the embodiment, when the terminal 2 performs the distance measurement determination, the terminal 2 does not need to transmit distance measurement data Sc.

The communication devices 13 may be connected through wireless communication to the system device 5.

The communication devices 13 do not need to be arranged outside the vehicle body and may be arranged inside the vehicle.

The distance measurement communication may be performed before the smart communication so that the authentication information Did of the communication device 13 is transmitted to the terminal 2 that verifies the authenticity of the authentication information Did.

The communication devices 13 may be configured so that a specific one of the communication devices 13 serves as a master communication device to manage the actions of the other slave communication device. In this case, for example, the master communication device may verify the authenticity of the authentication information Did.

The actuation unit 27 and the checking unit 28 do not need to be arranged in the communication device 13 and may be arranged at other locations.

The system device 5 may verify the authenticity of the authentication information Did.

The terminal 2 does not need to be authenticated in smart verification as long as the authenticity of the terminal 2 is verified.

The electronic key system 4 is not limited to a smart verification system and may be replaced by any other system. The frequencies of radio waves and a communication method used by electronic key system 4 may be changed to include various types.

Radio waves used for the distance measurement communication are not limited to radio waves in the UWB band and may be changed to radio waves in other frequencies such as radio waves for Bluetooth (registered trademark).

The authentication information Did is not limited to a unique ID of the vehicle 1 and may include various types of information as long as the vehicle 1 is identified.

The operation subject of the vehicle 1 does not have to lock and unlock a vehicle door or shifting power supply states of a vehicle power supply.

The operation subject 11 is not limited to the vehicle 1 and may be any other instrument or device.

Any one or more of devices that form the unauthorized communication prevention system 12 of the present disclosure (such as system device 5, communication device 13 (communication controller 16), terminal controller 7, and/or wireless unit 14 (communication controller 18)) can be configured to be a computer system including one or more processors and a non-transitory memory that stores instructions executable by the processor to implement various types of processes (such as unauthorized communication prevention process) in accordance with the above embodiment or the above modification. Alternatively, any one or more of the devices included in the unauthorized communication prevention system 12 may be configured with dedicated hardware such as an application specific integrated circuit (ASIC).

The present disclosure includes the following embodiments.

Embodiment 1

An unauthorized communication prevention system including:
  a communication device arranged in an operation subject that is operable by a terminal, in which the communication device performs wireless communication with the terminal;
  a notification unit arranged in the terminal, in which the notification unit notifies the communication device of authentication information unique to the operation subject;
  a checking unit that determines, with the authentication information, whether the terminal and the operation subject are a proper pair; and
  a location determination actuation unit that performs a process for determining a positional relationship of the terminal and the operation subject when the checking unit determines that the terminal and the operation subject are a proper pair.

Embodiment 2

The unauthorized communication prevention system according to embodiment 1, in which the notification unit notifies the communication device of the authentication information during distance measurement communication performed to measure a distance between the terminal and the operation subject.

Embodiment 3

The unauthorized communication prevention system according to embodiment 1 or 2, in which
  the communication device is one of a plurality of communication devices arranged in the operation subject,
  the terminal communicates with each of the communication devices by transmitting a unique communication device ID together with the authentication information from the notification unit to each of the communication devices,
  whenever each of the communication devices communicate with the terminal, the checking unit determines whether the terminal and the operation subject are a proper pair, and
  when the checking unit determines that the terminal and the operation subject are a proper pair, the location determination actuation unit performs a process for determining a positional relationship of the terminal and a corresponding one of the communication devices.

Embodiment 4

A computer system including:
  one or more processors; and
  a non-transitory memory that stores instructions executable by the processor to implement an unauthorized communication prevention process,
  in which the unauthorized communication prevention process includes
  notifying, with a terminal, a communication device, which is arranged in an operation subject operable by the terminal that performs wireless communication with the communication device, of unique authentication information of the operation subject,
  determining, with the authentication information, whether the terminal and the operation subject are a proper pair, and
  performing a process for determining a positional relationship of the terminal and the operation subject when the terminal and the operation subject are determined as being a proper pair.

The invention claimed is:

1. An unauthorized communication prevention system, comprising:
  a wireless unit arranged in a terminal; and
  a communication device, arranged in an operation subject, configured to determine a positional relationship of the terminal relative to the operation subject through a distance measurement communication, wherein
  the operation subject is configured to be actuated or allowed to be actuated in a state in which authentication is accomplished through wireless communication performed between the wireless unit and the communication device,
  the communication device is one of a plurality of communication devices arranged in the operation subject and configured to perform the distance measurement communication, which differs from communication for the authentication, with the wireless unit, the unauthorized communication prevention system further comprising:

a notifier arranged in the terminal and configured to, in a state in which the distance measuring communication using an encryption code is performed between the wireless unit and each of the communication devices, transmit a distance measurement signal to the communication device; and a controller, including at least a processor, arranged in the operation subject and configured to:

check, with the distance measurement signal, whether the terminal and the operation subject are a proper pair, perform a process for determining the positional relationship in accordance with the check result, and end the distance measurement communication in a state in which the terminal and the operation subject are not a proper pair.

2. An unauthorized communication prevention method for determining whether a positional relationship of a terminal relative to an operation subject is valid through a distance measurement communication, wherein the operation subject is actuated or allowed to be actuated when authentication is accomplished through wireless communication performed between a wireless unit arranged in the terminal and a communication device arranged in the operation subject, the communication device is one of a plurality of communication devices arranged in the operation subject and configured to perform the distance measurement communication, which differs from communication for the authentication, with the wireless unit, the unauthorized communication prevention method comprising:

when the distance measurement communication using an encryption code is performed between the wireless unit and each of the communication devices, transmitting, by a notifier arranged in the terminal, a distance measurement signal to the communication device;

checking, by a controller arranged in the operation subject, with the distance measurement signal, whether the terminal and the operation subject are a proper pair; and performing, by the controller, a process for determining the positional relationship in accordance with the checking result based on the distance measurement signal, wherein the controller ends the distance measurement communication when the terminal and the operation subject are not a proper pair.

* * * * *